(12) United States Patent
Taylor et al.

(10) Patent No.: US 8,059,298 B2
(45) Date of Patent: Nov. 15, 2011

(54) EFFICIENT PRINTER CONTROL ELECTRONICS

(75) Inventors: Richard D. Taylor, Eagle, ID (US); Mark D. Montierth, Meridian, ID (US)

(73) Assignee: Marvell International Technology Ltd. (BM)

( * ) Notice: Subject to any disclaimer, the term of this patent is extended or adjusted under 35 U.S.C. 154(b) by 143 days.

(21) Appl. No.: 12/419,815

(22) Filed: Apr. 7, 2009

(65) Prior Publication Data

US 2009/0190176 A1 Jul. 30, 2009

Related U.S. Application Data

(63) Continuation of application No. 10/655,418, filed on Sep. 3, 2003, now Pat. No. 7,525,679.

(51) Int. Cl.
*G06F 3/12* (2006.01)
(52) U.S. Cl. .... 358/1.15; 358/1.1; 358/1.9; 358/426.02; 399/66; 399/67; 347/59; 710/306; 710/311; 710/313; 714/727
(58) Field of Classification Search ............... 358/1.14, 358/1.15, 1.1, 426.02, 1.9; 347/59; 714/727; 710/306, 311, 313; 399/66, 67
See application file for complete search history.

(56) References Cited

U.S. PATENT DOCUMENTS

| | | | |
|---|---|---|---|
| 4,326,813 A | 4/1982 | Lomicka et al. | |
| 4,575,817 A | 3/1986 | Allen et al. | |
| 4,578,689 A * | 3/1986 | Spencer et al. | 347/129 |
| 4,589,764 A * | 5/1986 | Tadokoro et al. | 347/132 |
| 5,471,313 A | 11/1995 | Thieret et al. | |
| 5,483,625 A | 1/1996 | Robertson et al. | |
| 6,166,550 A | 12/2000 | Abramsohn et al. | |
| 6,178,009 B1 | 1/2001 | Yamada et al. | |
| 6,359,266 B2 * | 3/2002 | Little et al. | 219/501 |
| 6,384,930 B1 | 5/2002 | Ando | |
| 6,529,289 B1 | 3/2003 | Konno et al. | |
| 6,795,887 B1 * | 9/2004 | Cervantes | 710/316 |
| 7,124,231 B1 | 10/2006 | Garner et al. | |
| 7,382,474 B2 * | 6/2008 | Motosugi et al. | 358/1.14 |
| 2001/0055124 A1 | 12/2001 | Varga | |
| 2002/0172539 A1 * | 11/2002 | Iwamura | 400/582 |
| 2003/0043400 A1 | 3/2003 | Bearss et al. | |
| 2003/0123085 A1 | 7/2003 | Kata | |
| 2006/0119892 A1 | 6/2006 | Kujirai | |

OTHER PUBLICATIONS

United States Patent Application entitled, "System and Method of Recovering from Soft Memory Errors." Publication No. US 2003/0131307 A1. Publication date: Jul. 10, 2003. Inventors: Taylor et al.
United States Patent Application entitled, "Soft Error Recovery in Microprocessor Cache Memories." Publication No. US 2003/0131277 A1. Publication date: Jul. 10, 2003. Inventors: Taylor et al.
United States Patent Application entitled, "Built-in-Self-Test Using Embedded Memory and Processor in an Application Specific Integrated Circuit." Publication No. US 2003/0023914 A1. Publication date: Jan. 30, 2003. Inventors: Taylor et al.

* cited by examiner

*Primary Examiner* — Twyler L Haskins
*Assistant Examiner* — Dennis Dicker

(57) ABSTRACT

An apparatus (such as a printer) including a combination engine controller circuit board having a integrated circuit (IC) chip configured to process (format) incoming data as well as to control the operations of the apparatus is disclosed. The IC chip is adapted to receive and process data as well as to control the operations of the apparatus. For this reason, the IC chip is referred to as a combined controller IC.

13 Claims, 3 Drawing Sheets

# EFFICIENT PRINTER CONTROL ELECTRONICS

CROSS-REFERENCE TO RELATED APPLICATIONS

This application is a continuation of U.S. application Ser. No. 10/655,418, filed Sep. 3, 2003, which is hereby incorporated by reference.

BACKGROUND

The present invention relates to application specific integrated circuit (ASICS), and more particularly, to ASICS for controlling operations of various appliances such as printers.

Many electronic appliances include a processor, a control processor, to control operations of various components of the appliance. Some appliances include a second processor, a data processor, to process relatively large amounts of relatively complex data received by the appliance, generated by the appliance, or both. Further, these processors are often attached to its own printed circuit boards (PCBS). For example, current generation printers typically have this configuration.

FIG. 1A is a simplified schematic illustration of an appliance 10 (for example, a laser printer 10) having a prior art configuration. FIG. 1B is a more detailed schematic illustration of portions of the appliance 10. Referring to FIGS. 1A and 1B, the printer 10 receives complex data 22 from a host computer 20. The data 22 is analyzed and formatted by a data processor 32 on a formatter board 30. The formatted data is communicated to a control processor 42 on an engine controller board 40. The two processors 32 and 42 typically communicate via a serial interface 41.

The data processor 32 is typically a high performance ASIC (application specific integrated circuit) 32 having a number of portions integrated within the ASIC 32. For example, the ASIC 32 includes a processing core 36 and its own internal memory 34 such as DRAM (dynamic random access memory) 34. Further, the ASIC 32 may include other integrated portions 38 not illustrated in detail. The ASIC 32 operates at a relatively high speed, for example, 100 MHz, to perform complex tasks such as formatting the complex data 22 in preparation for printing by the printer 10. The formatted data is sent to the control processor 42 for printing.

The ASIC 32 is connected to an external memory 39 such as flash memory 39 containing instructions and various parameters used for the operations of the ASIC 32. Flash memory technology is known in the art as non-volatile memory that can be erased, reprogrammed, or updated. By updating the flash memory 39, the operations of the data processor 32 can be updated to accommodate updates or changes in technology.

The control processor 42 is typically a low performance microcontroller (compared to the data processor 32). The control processor 42 includes ROM (read only memory) 43 to permanently store instructions for its processor 46 and may include additional memory elements such as SRAM 44 (static random access memory) for its operation. The control processor 42 receives page formatting information The control processor 42 receives page formatting information from the data processor 32 and controls various electro-mechanical components (represented here as a box 50) to generate a printed page in accordance with the formatted data received from the data processor 32. The control processor 42 includes analog-to-digital converters (ADC) and digital-to-analog converters (DAC), collectively illustrated as ADAC 48. The ADAC 48 are connected to, communicate with, and control analog components 49 on the engine controller board 40. The analog components 49 are connected to, communicate with, and control the electro-mechanical components 50 of the printer 10. The electro-mechanical components 50 include, for example only, fuser, stepper motor, laser scanner, voltage supply, printer engine, page timer, drum, and paper sensors.

The current design suffers from a number of disadvantages. For example, two printed circuit boards 30 and 40 introduce complexity and require significant area and space within the printer 10. The two processors 32 and 42 often require different voltage levels requiring separate power supply circuitry for each of the processors 32 and 42. The instructions for the control processor 42 are embedded in the read only memory (ROM) 43. Accordingly, it cannot be updated after the initial programming. Since the ROM 43 cannot be updated after the initial programming, printer specific control processors 42 are programmed and stocked for each type and model of printer. The control processors 42 cannot be shared between differing models of the printers. In fact, even for the same model printers, differently programmed control processors 42 are stocked to accommodate printers shipped to differing areas. For example, different parameter settings, for example temperature settings for fusers, are needed for printers shipped to tropical regions compared to printers shipped to arctic regions.

Accordingly, there remains a need for a method and apparatus to eliminating or alleviate these disadvantages of the current appliances.

SUMMARY

The need is met by the present invention. According to a first embodiment of the present invention, an integrated circuit (IC) chip includes a processing core adapted to process digital data and controller circuits adapted to communicate with analog components control electro-mechanical components.

In a second embodiment of the present invention, an apparatus includes a combination engine controller board and memory connected to the combination engine controller board. The combination engine controller board includes an integrated circuit (IC) adapted to receive and process data, the IC having a processing core and controller circuits adapted to control electro-mechanical components. The memory includes instructions for the IC. The instructions, when executed by the IC, cause the IC to process the received data and to control operations of the electro-mechanical components.

Other aspects and advantages of the present invention will become apparent from the following detailed description, taken in conjunction with the accompanying drawings, illustrating by way of example the principles of the invention.

DETAILED DESCRIPTION

The present invention will now be described with reference to FIGS. 2A through 2B, which illustrate a sample embodiment of the present invention. As illustrated in the Figures, relative sizes of various portions, structures, or any combination of these are exaggerated for illustrative purposes and, thus, are provided to illustrate the general structures of the present invention.

As shown in the Figures for the purposes of illustration, one embodiment of the present invention is exemplified by an apparatus, for example a printer for printing data received from a host computer. The printer includes a combination engine controller board and various electro-mechanical components to accomplish its printing function. The combination engine controller board includes an ASIC chip and connected flash memory. Here, the ASIC chip formats the received data. Further, the ASIC chip is configured to include controller circuits adapted to control the electro-mechanical components of the printer. For this reason, the ASIC is also referred to as a combined controller ASIC.

Figure 1A:
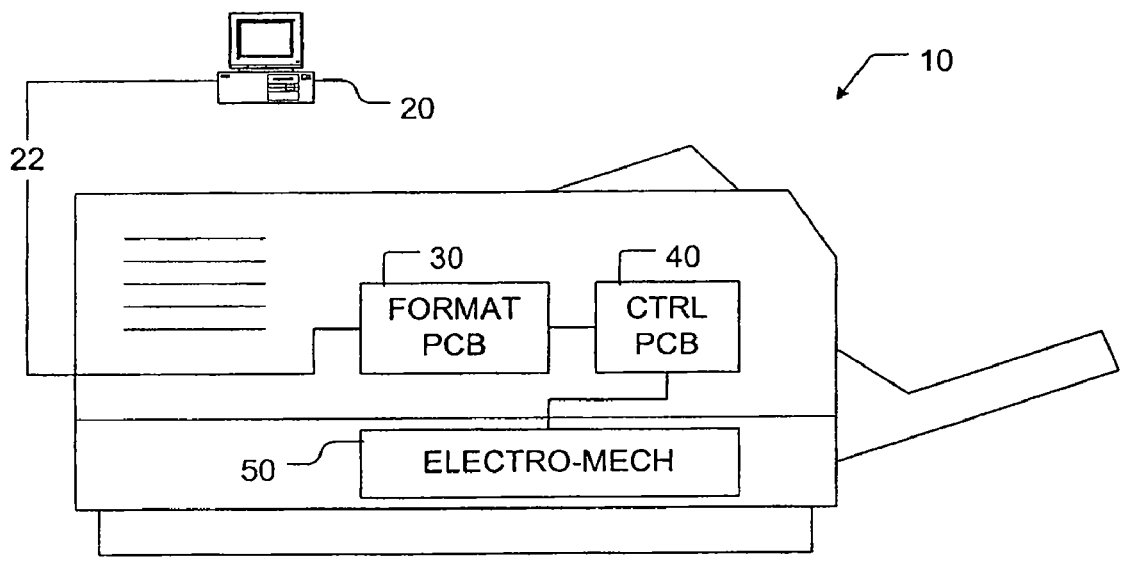
FIG. 1A is a simplified schematic view of a prior art apparatus.
Figure 1B:
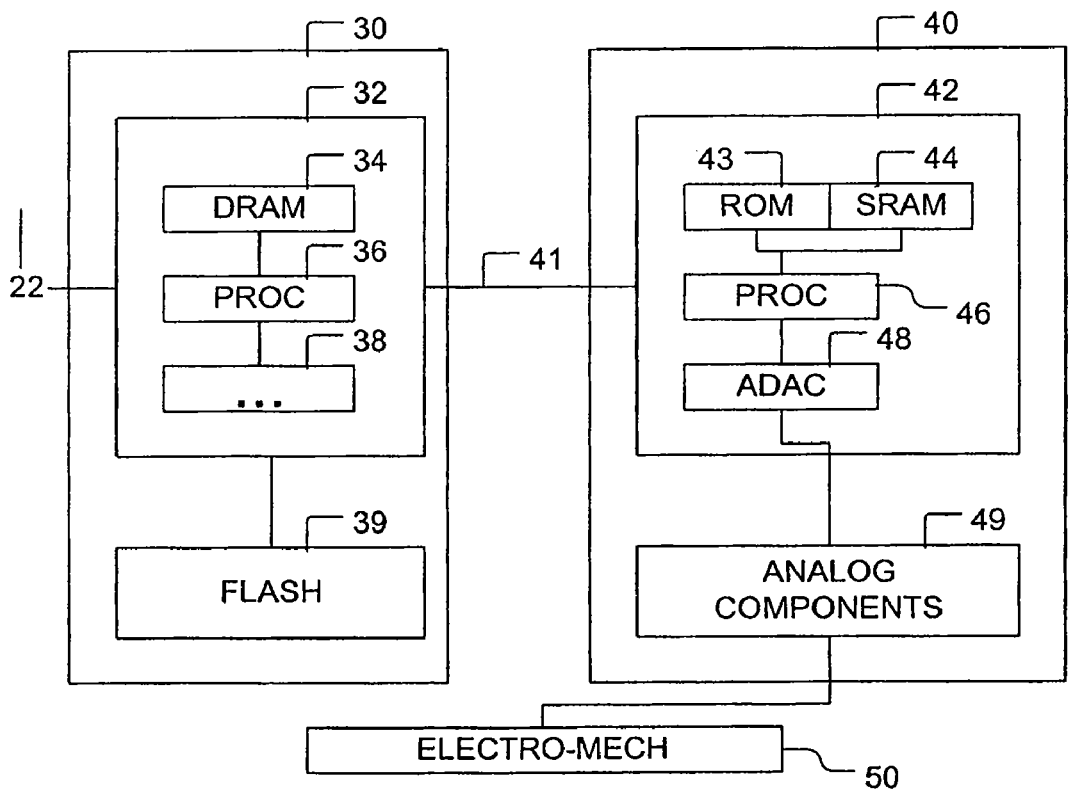
FIG. 1B is a more detailed schematic illustration of portions of the apparatus of FIG. 1A.

Because the ASIC chip performs both the formatting function and the control function, a second processor such as the control processor 42 of FIGS. 1A and 1B is not needed. Indeed, the need for the engine controller board 40 is eliminated. Thus, the printer is simplified, costs reduced, and reliability increased.

Furthermore, operations of the combined control ASIC is stored in a flash memory that can be updated with instructions and with operational parameters. Accordingly, there is no need to stock printer-specific processors or memory. The combined control ASIC part as well as the flash memory can be shared between printer models. The flash memory need only be programmed differently for different models or for different regional settings even with the same model. Consequently, significant manufacturing time and cost savings can be realized.

Figure 2A:
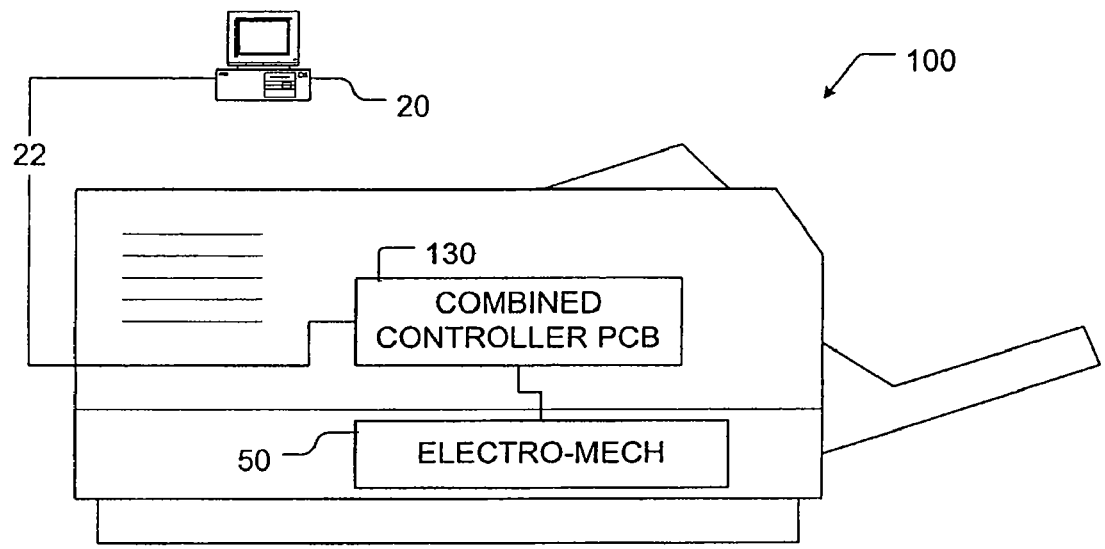
FIG. 2A is a simplified schematic view of an apparatus according to one embodiment of the present invention.

FIG. 2A is a simplified schematic view of an apparatus 100 according to one embodiment of the present invention illustrated as a printer 100. FIG. 2B is a more schematic illustration of portions of the apparatus 100 of FIG. 2A. The printer 100 of FIGS. 2A and 2B includes components that are similar to corresponding components of the printer 10 of FIGS. 1A and 1B. For convenience, components in FIGS. 2A and 2B that are similar to corresponding components in FIGS. 1A and 1B are assigned the same reference numbers. Different components are assigned different reference numbers.

Figure 2B:
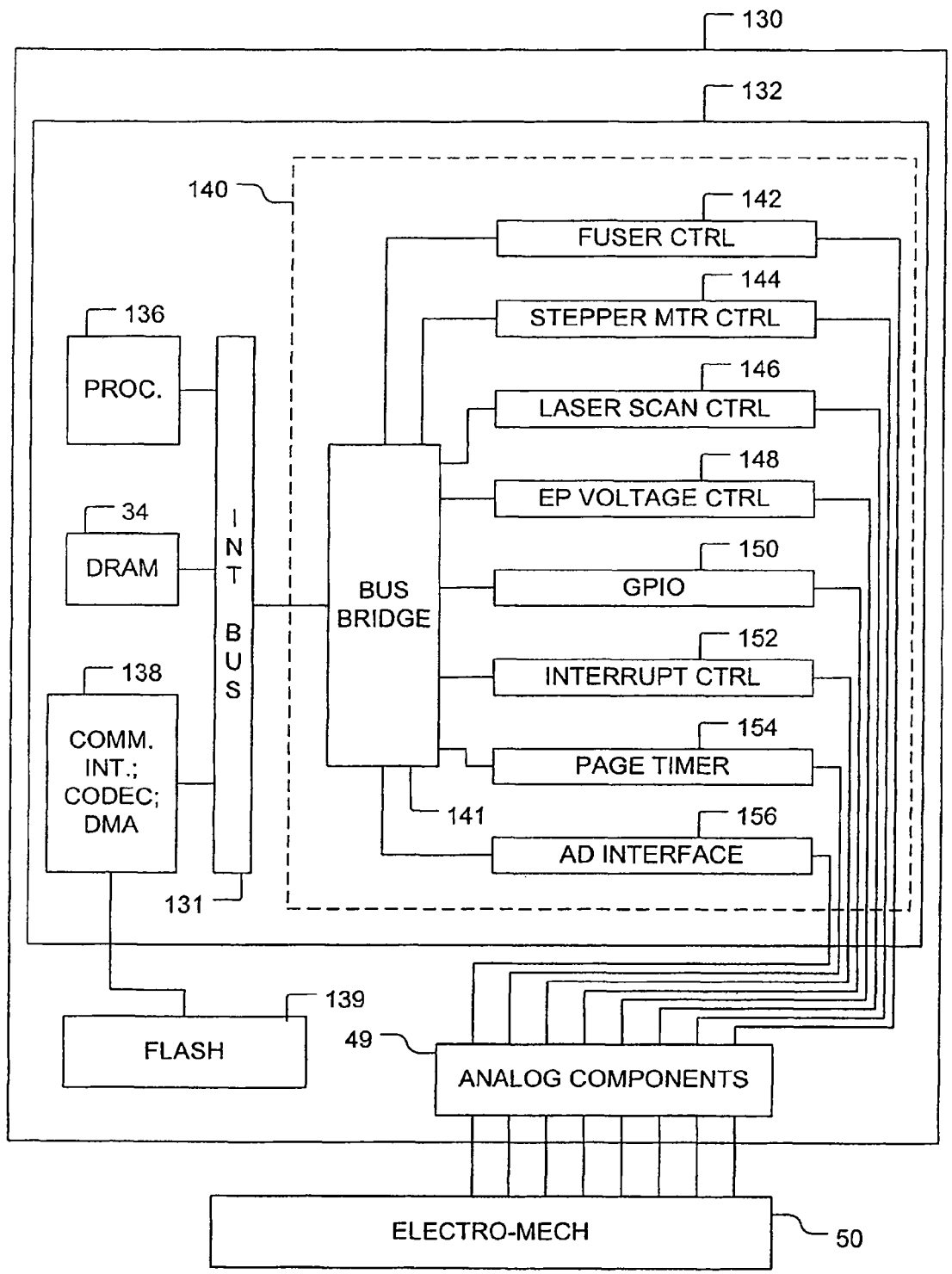
FIG. 2B is a more schematic illustration of portions of the apparatus of FIG. 2A.

Referring to FIGS. 2A and 2B, the printer 100 includes a combination engine controller board 130 including in integrated circuit (IC) 132 adapted to receive data 22 from a host computer 20, the data for printing by the printer 100. In the illustrated embodiment, the IC 132 is an application specific integrated circuit (ASIC). It is known in the industry that ASICS, in general, can be configured to include various portions, each portion having different electronic circuits and serving functions different than the other portions of the same ASIC.

Here, the ASIC 132 is configured to process (to format in this example) the received data 22. Further, the ASIC 132 is configured to include controller circuits 140 adapted to control the electro-mechanical components 50 of the printer 100. For this reason, the ASIC is also referred to as a combined controller ASIC 132. Instructions for the combined controller ASIC 132 to perform its functions can reside within the combined controller ASIC 132. Alternatively, the instructions for the combined controller ASIC 132 can be stored in memory 139 connected to but external to the combined controller ASIC 132. The external memory 139 is often a flash type memory which is non-volatile, but can be erased and reprogrammed. The instructions are often referred to as firmware.

The combined controller ASIC 132 includes a processor core 136 and its internal memory 138 such as DRAM 34. The combined controller ASIC 132 includes other portions for various functions such as communication interface, codec (coder-decoder circuits), and DMA (direct memory access) circuits. These other portions are illustrated in FIG. 2B as a single box 138. All these portions are connected to an internal bus 131 for communications.

The controller circuits 140 include a bus bridge 141 which bridges data between the internal bus 131 and other parts of the controller circuits 140. The bus bridge 141 attaches the controller circuits 140 to on-chip ASIC backplane. The controller circuits 140 also include a fuser controller 142, a stepper motor controller 144, a laser scanner controller 146, a voltage controller 148, general purpose input and output (GPIO) circuits 150, interrupt controller 152, page timer 154, and an analog-to-digital interface 156. Each of these parts of the control circuits 140 are discussed in more detail below.

The control circuits 140 are connected to, communicate with, and control analog components 49 on the combined engine controller board 130. The analog components 49 are connected to, communicate with, and control the electromechanical components 50 of the printer 10. The electromechanical components 50 include, for example only, fuser, stepper motor, laser scanner, voltage supply and control circuits, printer engine, sensors and interrupt generators, page timer, drum, paper sensors, and solenoids. Further, some analog components such as, for example only, analog-to-digital components, can be integrated in the ASIC 132.

Fuser Controller 142

The fuser controller 142 is used to ramp and maintain the temperature of the fuser (a part of the electro-mechanical component 50 of the printer 100). To prevent a fire hazard, the fuser controller 142 is serviced within 150 milliseconds (ms) of an interrupt request, or the fuser controller 142 is automatically disabled and reports a timeout error. The fuser controller 142 uses pulse width modulated (PWM) signal to switch a triac (of the electro-mechanical component 50 of the printer 100) that controls a 220/110 volt AC heating element.

An interrupt is generated when the fuser controller 142 is ready for an updated PWM value. If a "ready" bit is not cleared in about 150 ms, then the fuser controller 142 shuts down the PWM control as a safety precaution.

The fuser controller 142 includes a fuser control register one embodiment of which is illustrated below (TABLE 1) as a 32-bit wide register having several significant bits. This register controls the state of a fuser power relay (an additional safety interlock within the electro-mechanical component 50 of the printer 100). The relay is enabled to pass power to the triac. The fuser power relay should be enabled prior to enabling the fuser enable pulse-width-modulated (PWD) output, and should remain enabled while fuser enable output signal/bit (FSRE) is active. An enable bit enables a fuser ready output (triac PWM control).

TABLE 1

| Fuser Control Register (FCR) | | | | | | | | | | | | | | | | | | | | | | | | | | | | | | Read/Write | | | | | | | 0x010500C0 | |
|---|---|---|---|---|---|---|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | E | R |
| Default | | | | | | | | | | | | | | | | | | | | | | | | | | | | | | | |
| X X | X X | X X | X | X | X | X | X | X | X | X | X | X | X | X | X | X | X | X | X | X | X | X | X | X | X | X | X | X | X | 0 | 0 |

R: Fuser safety Ready enable (1 = enable relay, 0 = disable relay)

E: Enable fuser enable (FSRE) output (1 = enabled)

The fuser controller 142 includes a fuser status register one embodiment of which is illustrated below (TABLE 2) as a 32-bit wide register having several significant bits. The fuser status register is used to indicate readiness of the fuser controller 142 for a PWM value update. Typically, the firmware clears the Ready bit (R-bit shown in below) within approximately 150 ms or a timeout occurs. The firmware optionally updates values in a fuser chop interval register and then clears the Ready bit. One embodiment of the fuser interval register is also illustrated below. If the firmware does not respond within approximately 150 ms of ready becoming true (an interrupt is also generated), then a timeout occurs which disables the FSRE output and sets the Timeout Error bit. The firmware can clear the Timeout Error bit by writing to this register.

TABLE 2

| Fuser Status Register (FSR) | | | | | | | | | | | | | | | | | | | | | | | | | | | | | | Read/Write | | | | | | | 0x010500C4 | |
|---|---|---|---|---|---|---|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | T | R | F |
| Default | | | | | | | | | | | | | | | | | | | | | | | | | | | | | | | |
| X X | X X | X X | X | X | X | X | X | X | X | X | X | X | X | X | X | X | X | X | X | X | X | X | X | X | X | X | X | X | 0 | 0 | 0 |

F: FSRE (state of the FSRE output for testing, read only)

R: Ready for PWM value update (1 = ready)

T: Timeout Error (1 = error)

The fuser controller 142 includes the fuser chop interval register one embodiment of which is illustrated (TABLE 3) below as a 32-bit wide register. Here, 16-bits are used to indicate a chop interval in microseconds (us). The chop interval specifies the basic unit of time used for the PWM output signal. This value is typically set to ½ of the AC line frequency (e.g. 8333 for 60 Hz). This value allows the triac to be enabled for quantum intervals of the AC power cycle to provide a predictable RMS (root mean squared) power output for any given PWM waveform.

TABLE 3

| Fuser Chop Interval Register (FCIR) | | | | | | | | | | | | | | | | | | | | | | | | | | | | | | Read/Write | | | | | | | 0x010500C8 | |
|---|---|---|---|---|---|---|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | 0 | 0 | 0 | 0 | 0 | 0 | 0 | 0 | 0 | 0 | 0 | 0 | 0 | 0 | 0 | I | I | I | I | I | I | I | I | I | I | I | I | I | I | I | I |
| Default | | | | | | | | | | | | | | | | | | | | | | | | | | | | | | | |
| X X | X X | X X | X | X | X | X | X | X | X | X | X | X | X | X | X | 0 | 0 | 0 | 0 | 0 | 0 | 0 | 0 | 0 | 0 | 0 | 0 | 0 | 0 | 0 | 0 |

I[15:0]: Chop Interval (in μSec)

The fuser controller 142 includes a fuser PWM register one embodiment of which is illustrated below (TABLE 4) as a 32-bit wide register. The fuser PWM register defines the FSRE (triac control) output waveform.

TABLE 4

| Fuser PWM Register (FPR) | | | | | | | | | | | | | | | | | | | | | | | | | | | | | | | Read/Write | | | | | | | | 0x010500CC | | |
|---|---|---|---|---|---|---|---|---|---|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | 0 | 0 | 0 | 0 | 0 | 0 | 0 | A | A | A | A | B | B | B | B | C | C | C | C | C | D | D | D | D | E | E | E | E | F | F | F | F |
| Default | | | | | | | | | | | | | | | | | | | | | | | | | | | | | | | |
| X | X | X | X | X | X | X | X | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

A[3:0]: High Interval (first period)
B[3:0]: Low Interval (first period)
C[3:0]: High Interval (second period, may be zero)
D[3:0]: Low Interval (second period, may be zero)
E[3:0]: High Interval (third period, may be zero)
F[3:0]: Low Interval (third period, may be zero)

Example PWM values are listed in TABLE 4 below.

TABLE 4

| n | latency | dutycycle | register |
|---|---|---|---|
| 0 | 15 | 0.0% | 0x0f0000 |
| 7 | 14 | 7.1% | 0x1d0000 |
| 8 | 12 | 8.3% | 0x1b0000 |
| 9 | 11 | 9.1% | 0x1a0000 |
| 10 | 10 | 10.0% | 0x190000 |
| 11 | 9 | 11.1% | 0x180000 |
| 13 | 15 | 13.3% | 0x111c00 |
| 14 | 14 | 14.3% | 0x111b00 |
| 15 | 13 | 15.4% | 0x111a00 |
| 17 | 6 | 16.7% | 0x150000 |
| 18 | 11 | 18.2% | 0x111800 |
| 20 | 5 | 20.0% | 0x140000 |
| 21 | 14 | 21.4% | 0x111119 |
| 22 | 9 | 22.2% | 0x111600 |
| 23 | 13 | 23.1% | 0x111118 |
| 25 | 8 | 25.0% | 0x151100 |
| 27 | 11 | 27.3% | 0x111116 |
| 29 | 7 | 28.6% | 0x141100 |
| 30 | 10 | 30.0% | 0x151111 |
| 33 | 9 | 33.3% | 0x111114 |
| 38 | 8 | 37.5% | 0x131111 |
| 40 | 5 | 40.0% | 0x121100 |
| 43 | 7 | 42.9% | 0x121111 |
| 50 | 6 | 50.0% | 0x111111 |
| 57 | 7 | 57.1% | 0x111121 |
| 60 | 5 | 60.0% | 0x211100 |
| 63 | 8 | 62.5% | 0x311111 |
| 67 | 6 | 66.7% | 0x311100 |
| 70 | 10 | 70.0% | 0x511111 |
| 71 | 7 | 71.4% | 0x114100 |
| 73 | 11 | 72.7% | 0x611111 |
| 75 | 8 | 75.0% | 0x511100 |
| 77 | 13 | 76.9% | 0x811111 |
| 78 | 9 | 77.8% | 0x611100 |

TABLE 4-continued

| n | latency | dutycycle | register |
|---|---|---|---|
| 79 | 14 | 78.6% | 0x911111 |
| 80 | 5 | 80.0% | 0x410000 |
| 82 | 11 | 81.8% | 0x811100 |
| 83 | 12 | 83.3% | 0x119100 |
| 85 | 13 | 84.6% | 0xa11100 |
| 86 | 7 | 85.7% | 0x610000 |
| 87 | 15 | 86.7% | 0xc11100 |
| 88 | 8 | 87.5% | 0x710000 |
| 89 | 9 | 88.9% | 0x810000 |
| 90 | 10 | 90.0% | 0x910000 |
| 91 | 11 | 90.9% | 0xa10000 |
| 92 | 12 | 91.7% | 0xb10000 |
| 93 | 14 | 92.9% | 0xd10000 |
| 100 | 15 | 100.0% | 0xf00000 |

Stepper Motor Controller 144

The stepper motor controller 144 is used to control a stepper motor (an electro-mechanical component 50 of the printer 100). An interrupt is generated when the stepper motor controller 144 is ready for a new stepper period value. The interrupt may be used to programmatically ramp the stepper motor up to full speed.

The stepper motor controller 144 includes a stepper motor control register one embodiment of which is illustrated (TABLE 5) below as a 32-bit wide register. This register controls the functionality of the stepper motor. Winding of the stepper motor are powered when Stepper Motor Enable bit is set. Phase outputs of the stepper motor are activated when Step Enable bit is set. The Update Interval bits specify how often an interrupt is generated requesting a period value change (and how often the corresponding Ready bit is set in a stepper motor status register). Using the quarter-period setting can result in a smoother ramp.

TABLE 5

| Stepper Motor Control Register (SMCR) | | | | | | | | | | | | | | | | | | | | | | | | | | | | | Read/Write | | | | | | | | | | 0x01050040 | | |
|---|---|---|---|---|---|---|---|---|---|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | U | U | S | M |
| Default | | | | | | | | | | | | | | | | | | | | | | | | | | | | | | | |
| X | X | X | X | X | X | X | X | X | X | X | X | X | X | X | X | X | X | X | X | X | X | X | X | X | X | X | X | 0 | 0 | 0 | 0 |

U[1:0]: Update Interval
00 = request update on every quarter-period
01 = request update on every half-period
1x = request update on every full-period
S: Step Enable (1 = enabled)
M: Stepper Motor Enable (1 = enabled)

The stepper motor controller 144 includes a stepper motor status register one embodiment of which is illustrated (TABLE 6) below as a 32-bit wide register. In the stepper motor status register, a Ready bit is set when the stepper motor controller 144 is ready for an updated stepper period (used to ramp the stepper motor up to speed). How often the Ready bit is set depends on the setting of the Update Interval bits in the stepper motor controller 144. An interrupt is generated when the Ready bit is high. To clear the interrupt, the Ready bit is written to zero. Two phase outputs can be observed via this register for testing purposes.

TABLE 6

| Stepper Motor Status Register (SMSR) | | | | | | | | | | | | | | | | | | | | | | | | | | | | | Read | | | | | | | | | 0x01050048 | | |
|---|---|---|---|---|---|---|---|---|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | | | | | | | | | |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | R | 0 | B | A | | | | | | | | | |
| Default | | | | | | | | | | | | | | | | | | | | | | | | | | | | | | | | | | | | | | | | |
| X | X | X | X | X | X | X | X | X | X | X | X | X | X | X | X | X | X | X | X | X | X | X | X | X | X | 0 | X | 0 | 0 | | | | | | | | | | | |

R: Ready for Update (1 = ready for updated stepper period)
A: Phase A ouput loopback (read only, for testing purposes)
B: Phase B output loopback (read only, for testing purposes)

The stepper motor controller 144 includes a stepper motor period register one embodiment of which is illustrated below (TABLE 7) as a 32-bit wide register. The stepper motor period register specifies the stepper motor period. It is typically set to one quarter of the desired period (in clock cycles).

TABLE 7

| Stepper Motor Period Register (SMPR) | | | | | | | | | | | | | | | | | | | | | | | | | | | | | | Read/Write | | | | | | | | 0x01050044 | | |
|---|---|---|---|---|---|---|---|---|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | | | | | | | | | |
| 0 | 0 | 0 | 0 | 0 | 0 | 0 | 0 | 0 | 0 | 0 | 0 | Q | Q | Q | Q | Q | Q | Q | Q | Q | Q | Q | Q | Q | Q | Q | Q | Q | Q | Q | Q | | | | | | | | | |
| Default | | | | | | | | | | | | | | | | | | | | | | | | | | | | | | | | | | | | | | | | |
| X | X | X | X | X | X | X | X | X | X | X | X | 0 | 0 | 0 | 0 | 0 | 0 | 0 | 0 | 0 | 0 | 0 | 0 | 0 | 0 | 0 | 0 | 0 | 0 | 0 | 0 | | | | | | | | | |

Q[19:0]: Quarter Period Value (in clock cycles, $2 < Q < 2^{20}$)

Laser Scanner Controller 146

Figure 3:
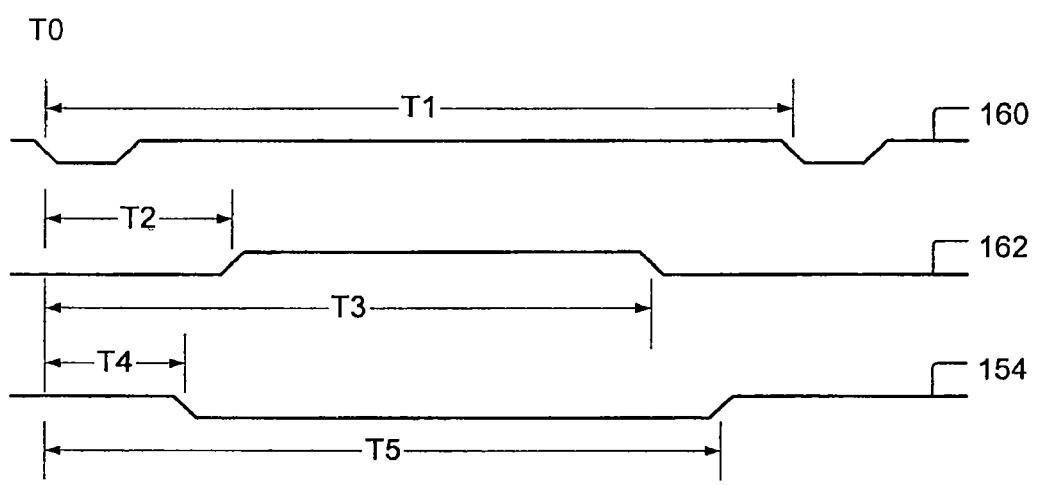
FIG. 3 illustrates a timing diagram.

The laser scanner controller 146 maintains the proper scan mirror rotation frequency as a closed-loop feedback system of laser and scanner (both components of the electro-mechanical component 50 of the printer 100). The laser scanner controller 146 maintains accurate scan rotation, controls the laser for horizontal synchronization, and defines the printable region. A Laser Scanner interrupt is generated when the status changes (for example, when an error occurs due to a scanner malfunction). FIG. 3 illustrates a timing diagram showing five count values—T1, T2, T3, T4, and T5—that are controlled by the laser scanner controller 146. For example, time period T1 defines the horizontal beam sweep period; periods T2 and T3 define the printable region (enable laser); and periods T4 and T5 define the synchronization window (looking for raw beam detect). Such techniques are known in the art. In FIG. 3, raw beam detect (BDI) signal 160 is raw signal from a horizontal sync optical sensor. This sensor detects laser beam as it sweeps. PrintWindow 162 defines the printable region of each line. BDwindow 164 defines the time where the laser is forced on (for horizontal beam detection).

The laser scanner controller 146 includes five timing registers to store these timing values—T1, T2, T3, T4, and T5. One embodiment of these registers is illustrated (TABLE 8) below, each as a 32-bit wide register. These registers specify the desired timing and are configured before enabling the laser scanner motor.

TABLE 8

| Laser Scanner Timing Register 1 (LTR1) | Read/Write | 0x01050088 |
|---|---|---|
| Laser Scanner Timing Register 2 (LTR2) | Read/Write | 0x0105008C |
| Laser Scanner Timing Register 3 (LTR3) | Read/Write | 0x01050090 |
| Laser Scanner Timing Register 4 (LTR4) | Read/Write | 0x01050094 |
| Laser Scanner Timing Register 5 (LTR5) | Read/Write | 0x01050098 |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | V | V | V | V | V | V | V | V | V | V | V | V | V | V | V | V |
| Default | | | | | | | | | | | | | | | | | | | | | | | | | | | | | | | |
| X | X | X | X | X | X | X | X | X | X | X | X | 0 | 0 | 0 | 0 | 0 | 0 | 0 | 0 | 0 | 0 | 0 | 0 | 0 | 0 | 0 | 0 | 0 | 0 | 0 | 0 |

V[15:0]: Timing parameter value
The values specify the timing for each parameter. The value is the number of system clock cycles (for example, 40 ns per cycle).

The laser scanner controller 146 includes a laser scanner control register one embodiment of which is illustrated (TABLE 9) below as a 32-bit wide register. This register controls the laser scanner motor closed-loop feedback. The motor is enabled only after programming the timing registers discussed above. The minimum correction pulse width value of the laser scanner control register can be used to prevent glitches on the adjustment output signals (specifying a minimum adjustment pulse width). The In-lock correction pulse limit, when enabled, allows only minor corrections (the correction is equal to W, the minimum pulse width) after the scan motor is locked (to improve noise immunity).

| Laser Scanner Control Register (LCR) | | | | | | | | | | | | | | | | | | | | | | | | | | | | | Read/Write | | | 0x01050080 |
|---|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | |
| 0 | 0 | 0 | 0 | 0 | 0 | 0 | 0 | 0 | 0 | 0 | 0 | 0 | 0 | 0 | 0 | 0 | 0 | W | W | W | W | W | W | X | X | X | X | X | X | D | E | default |
| X | X | X | X | X | X | X | X | X | X | X | X | X | X | X | X | 0 | 0 | 0 | 0 | 0 | 0 | 0 | 0 | X | X | X | X | X | X | 0 | 0 | |

W[5:0]: Minimum correction pulse width
D: In-lock correction pulse width limit (1 = enable maximum pulse width)
E: Enable scan motor (1 = enable)

The laser scanner controller 146 includes a laser scanner status register one embodiment of which is illustrated below as a 32-bit wide register. This register indicates the status of the scanner motor speed. An interrupt is generated when this status changes.

| Laser Scanner Status Register (LSR) | | | | | | | | | | | | | | | | | | | | | | | | | | | | | Read/Write | | | 0x01050084 |
|---|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | M | S | L | default |
| X | X | X | X | X | X | X | X | X | X | X | X | X | X | X | X | X | X | X | X | X | X | X | X | X | X | X | X | X | 0 | 0 | 0 | |

L Locked (1 = scanner at speed)
S: Speed Error (1 = scanner malfunction - fell out of lock)
M: Missing BD error (1 = scanner malfunction - no BD when expected)
The locked bit is read-only. The error bits must manually cleared by writing them to zero.

Voltage Controller 148

Transformers and diode/capacitor voltage doublers are used to generate the high-voltage supplies as parts of the electro-mechanical component 50 of the printer 100. Switching waveforms to generate these voltages are provided by the voltage controller 148. Five programmable outputs are provided to generate up to five high voltages for the electrophotographic process.

An interrupt is generated on each of the specified output state changes (when enabled). Values for these programmable output signals are stored in five high voltage registers of the voltage controller 148. One embodiment of these high voltage registers are illustrated below.

| | Read/Write | |
|---|---|---|
| High Voltage Register 0 (HVR0) | Read/Write | 0x01050140 |
| High Voltage Register 1 (HVR1) | Read/Write | 0x01050144 |
| High Voltage Register 2 (HVR2) | Read/Write | 0x01050148 |
| High Voltage Register 3 (HVR3) | Read/Write | 0x0105014C |
| High Voltage Register 4 (HVR4) | Read/Write | 0x01050150 |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| E | Q | U | U | H | H | H | H | H | H | H | H | H | H | H | H | I | I | D | D | L | L | L | L | L | L | L | L | L | L | L | L |

-continued

| Default | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 0 | q | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

L[11:0]: Low period
D[1:0]: Low period units
00 = clocks
01 = μSec
10 = 10 μSec
11 = 100 μSec
I[1:0]: Interrupt Mode
00 = none
01 = falling edge
10 = positive edge
11 = both edges
H[11:0]: High period
U[1:0]: High period units
00 = clocks
01 = μSec
10 = 10 μSec
11 = 100 μSec
Q: Quiescent state (when disabled)
E: Enable (1 = enabled)

General Purpose Input and Output (GPIO) 150

The GPIO 150 provides an interface to the sensors and paper pick solenoid as well as to the print engine. Further, in some embodiments, it also provides a gating signal for the beam detect to support the legacy video hardware. A GPIO interrupt is generated when the value of mechanism sensor register changes. The GPIO 150 includes the mechanism sensor register one embodiment of which is illustrated below as a 32-bit wide register. This register is used to determine the value of the mechanism sensors. For example, sensor value Debounce value is provided in hardware to provide stable read values for status. Optical sensors (nPaperIn and nPaperOut) received 512 microsecond (us) of debounce. The door open switch (nDoorOpen) receives 32 ms of debounce. A GPIO interrupt is generated when the value of this register changes.

| Mechanism Sensor Register (MSR) | | | | | | | | | | | | | | | | | | | | | | | | | | | | Read | | 0x01050100 | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | D | P | I |
| Default | | | | | | | | | | | | | | | | | | | | | | | | | | | | | | | |
| X | X | X | X | X | X | X | X | X | X | X | X | X | X | X | X | X | X | X | X | X | X | X | X | X | X | X | X | X | X | X | X |

D: Door open (1 = door open)
P: Paper output sensor (1 = paper present in output path)
I: paper input sensor (1 = paper present in input path)

The GPIO 150 includes a mechanism control register one embodiment of which is illustrated below as a 32-bit wide register. This register is used to control the paper pick solenoid.

| Mechanism Control Register (MCR) | | | | | | | | | | | | | | | | | | | | | | | | | | | | Read/Write | | 0x01050104 | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | S |
| Default | | | | | | | | | | | | | | | | | | | | | | | | | | | | | | | |
| X | X | X | X | X | X | X | X | X | X | X | X | X | X | X | X | X | X | X | X | X | X | X | X | X | X | X | X | X | X | X | 0 |

S: paper pick solenoid (1 = solenoid active)

The GPIO 150 includes a beam detect register one embodiment of which is illustrated below as a 32-bit wide register. This register is used to enable a beam detect output (BDO) signal, a signal from a video controller. This is provided in some embodiments for legacy hardware compatibility. The firmware enables the beam detect output signal after the top of a page is detected. This register may not be required for all embodiments.

| Beam Detect Register (BDR) | | | | | | | | | | | | | | | | | | | | | | | | | Read/Write | | | | | 0x01050108 | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | E |
| Default | | | | | | | | | | | | | | | | | | | | | | | | | | | | | | | |
| X | X | X | X | X | X | X | X | X | X | X | X | X | X | X | X | X | X | X | X | X | X | X | X | X | X | X | X | X | X | X | 0 |

E: Beam detect Enable (1 = enabled)

Interrupt Controller 152

The interrupt controller 152 generates an interrupt at 10 ms intervals to enable a top-level periodic servicing routine. For example, the fuser controller 142 has a real-time interrupt requirement—for safety reasons, the controller disables itself if not serviced within about 150 ms. For performance reasons, the stepper motor controller 144 is serviced quickly during ramp up. The paper input sensor (GPIO) needs to be detected quickly, for example less than one ms to determine the top-of-page accurately.

Here is a brief description of the interrupt sources:

Page Timer—
Interrupt when reacting trigger count (pulse)
Time—
Interrupt every 10 ms (pulse)
EP Voltage—
Interrupt on selected PWM output edges (pulse)
GPIO—
Interrupt when sensor status value changes (pulse)
Fuser—
Interrupt when ready for next PWM code
LaserScanner—
Interrupt on status change
A2D—
Interrupt each time all A-to-D values are updated (pulse)
Stepper Motor—
Interrupt when ready for new period value (quarter/half/full period)

The interrupt controller 152 includes an interrupt enable register one embodiment of which is illustrated below as a 32-bit wide register. When corresponding bit is set high in the interrupt enable register, the interrupt will be enabled (passed to the top-level interrupt controller); otherwise the interrupt is masked. Even when masked, an interrupt condition may be seen in an interrupt pending register also illustrated below.

| Interrupt Enable Register (IER) | | | | | | | | | | | | | | | | | | | | | | | | Read/Write | | | | | | 0x010501C4 | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | H | G | F | E | D | C | B | A |
| default | | | | | | | | | | | | | | | | | | | | | | | | | | | | | | | |
| X | X | X | X | X | X | X | X | X | X | X | X | X | X | X | X | X | X | X | X | X | X | X | X | 0 | 0 | 0 | 0 | 0 | 0 | 0 | 0 |

A: Page Timer Interrupt Enable
B: Time Interrupt Enable
C: EP Voltage Interrupt Enable
D: GPIO Interrupt Enable
E: Fuser Interrupt Enable
F: Laser Scanner Interrupt Enable
G: A2D Interrupt Enable
H: Stepper Motor Interrupt Enable The interrupt controller 152 includes the interrupt pending register one embodiment of which is illustrated below as a 32-bit wide register. When an interrupt is received by the interrupt controller 152, a pending bit is set and remains set until cleared by writing the interrupt acknowledge register illustrated below. Firmware can set the interrupt by writing to the interrupt force register also illustrated below. For interrupt sources that are enabled in the interrupt enable register, an interrupt will be passed to the top-level interrupt controller when the corresponding bit is set in the interrupt pending register.

| Interrupt Pending Register (IPR) | | | | | | | | | | | | | | | | | | | | | | | | Read | | | | | | 0x010501C0 | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | H | G | F | E | D | C | B | A |
| Default | | | | | | | | | | | | | | | | | | | | | | | | | | | | | | | |
| X | X | X | X | X | X | X | X | X | X | X | X | X | X | X | X | X | X | X | X | X | X | X | X | 0 | 0 | 0 | 0 | 0 | 0 | 0 | 0 |

A: Page Timer Interrupt Enable
B: Time Interrupt Enable
C: EP Voltage Interrupt Enable
D: GPIO Interrupt Enable
E: Fuser Interrupt Enable
F: LaserScanner Interrupt Enable
G: A2D Interrupt Enable
H: Stepper Motor Interrupt Enable The interrupt controller 152 includes the interrupt acknowledge register one embodiment of which is illustrated below as a 32-bit wide register. When an interrupt is received by interrupt controller 152, the pending bit is set and remains set until cleared by writing the interrupt acknowledge register. To clear a pending interrupt, the corresponding bit is set high in this register (there is no need to write it back low). Note that for level interrupts, writes to this register are ineffective if the interrupting source is still present; rather, the interrupting source should be cleared first.

| Interrupt Acknowledge Register (IAR) | | | | | | | | | | | | | | | | | | | | | | | | Write | | | | 0x010501C8 | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 8 | 5 | 4 | 3 | 2 | 1 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | H | G | F | E | D | C | B | A |
| default | | | | | | | | | | | | | | | | | | | | | | | | | | | | | | | |
| X | X | X | X | X | X | X | X | X | X | X | X | X | X | X | X | X | X | X | X | X | X | X | X | 0 | 0 | 0 | 0 | 0 | 0 | 0 | 0 |

A: Page Timer Interrupt Enable
B: Time Interrupt Enable
C: EP Voltage Interrupt Enable
D: GPIO Interrupt Enable
E: Fuser Interrupt Enable
F: LaserScanner Interrupt Enable
G: A2D Interrupt Enable
H: Stepper Motor Interrupt Enable The interrupt controller 152 includes the interrupt force register one embodiment of which is illustrated below as a 32-bit wide register. This register enables firmware to set individual interrupts. After writing to this register, the corresponding bits are set in the interrupt pending register, and the interrupt is passed to the top-level interrupt controller, if enabled. There is no need to clear the bits back to zero.

| Interrupt Force Register (IFR) | | | | | | | | | | | | | | | | | | | | | | | | Write | | | | 0x010501CC | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | H | G | F | E | D | C | B | A |
| default | | | | | | | | | | | | | | | | | | | | | | | | | | | | | | | |
| X | X | X | X | X | X | X | X | X | X | X | X | X | X | X | X | X | X | X | X | X | X | X | X | 0 | 0 | 0 | 0 | 0 | 0 | 0 | 0 |

A: Page Timer Interrupt Enable
B: Time Interrupt Enable
C: EP Voltage Interrupt Enable
D: GPIO Interrupt Enable
E: Fuser Interrupt Enable
F: LaserScanner Interrupt Enable
G: A2D Interrupt Enable
H: Stepper Motor Interrupt Enable Page Timer 154

The page timer 154 is a 16-bit counter with one ms resolution. It can be used as a general purpose timer and is intended for keeping track of the page control timing sequence. A page timer interrupt is generated, if enabled, when the counter reaches a predetermined count. The page timer 154 includes a timer control register one embodiment of which is illustrated below as a 32-bit wide register. This register enables the page timer 154, a page timer interrupt, or both. The register is also used to specify a trigger count (an interrupt is generated, if enabled, when the trigger count is reached). The page timer 154 is reset to zero when the counter is disabled (it can also be cleared by writing directly to the count register).

| Timer Control Register (TCR) | | | | | | | | | | | | | | | | | | | | | | | | Read | | | | 0x01050180 | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| E | I | 0 | 0 | 0 | 0 | 0 | 0 | 0 | 0 | 0 | 0 | 0 | 0 | 0 | 0 | T | T | T | T | T | T | T | T | T | T | T | T | T | T | T | T |
| default | | | | | | | | | | | | | | | | | | | | | | | | | | | | | | | |
| 0 | 0 | X | X | X | X | X | X | X | X | X | X | X | X | X | X | 0 | 0 | 0 | 0 | 0 | 0 | 0 | 0 | 0 | 0 | 0 | 0 | 0 | 0 | 0 | 0 |

E: Counter Enable (1 = enable counter)
I: Interrupt enable (1 = enable interrupt)
T[15:0]: Trigger count for interrupt The page timer 154 includes a timer elaptedtime register one embodiment of which is illustrated below as a 32-bit wide register. This register indicates how many milliseconds have elapsed since the counter was reset. The count can also be written to initialize a value, if desired. The counter increments once every millisecond and rolls over after reaching the maximum count. The ElapsedTime is cleared to zero if the timer is disabled in the timer control register.

The Flash Memory 139

Continuing to refer to FIGS. 2A and 2B, the combination engine controller board 130 includes memory 139 such as flash-type memory for storage of instructions for the combined controller ASIC 132 to execute. These instructions, when executed by the combined controller ASIC 132, causes the combined controller ASIC 132 to process the received data 22 such as to format the received data 22 for printing.

| | Timer ElapsedTime Register (TER) | | | | | | | | | | | | | | | | | | | | | | Read | | | | | 0x01050184 | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | 0 | 0 | 0 | 0 | 0 | 0 | 0 | 0 | 0 | 0 | 0 | 0 | 0 | 0 | 0 | C | C | C | C | C | C | C | C | C | C | C | C | C | C | C | C |
| Default | | | | | | | | | | | | | | | | | | | | | | | | | | | | | | | |
| X | X | X | X | X | X | X | X | X | X | X | X | X | X | X | X | X | X | X | X | X | X | X | X | 0 | 0 | 0 | 0 | 0 | 0 | 0 | 0 |

C[15:0]: Count (in milliseconds)

Analog to Digital Converter Interface 156

The analog to digital (AD) converter interface 156 provides an interface to an external 4-channel serial AD converter such as, for example, National model ADC0834. When the AD interface 156 is enabled, the interface 156 continually reads sampled values from the AD converter and updates each of the registers of the controller circuits 140 to eliminate latency and overhead of manual reads. AD interrupts are generated when all channel values have been updated (regardless of whether or not the values actually changed). The AD channels are used to measure items such as fuser temperature, electrophotography voltages, etc.

The analog to digital (AD, A2D) converter interface 156 includes an AD enable register one embodiment of which is illustrated below as a 32-bit wide register. This register is set to enable or disable the analog-to-digital interface 156. When enabled, four values may be read from the A2D data registers also illustrated below.

Further, the instructions, when executed by the combined controller ASIC 132, cause the combined controller ASIC 132 to control the operations of the electro-mechanical components 50 via its controller circuits 140. These instructions include, for example, interrupt service routines that execute on various interrupts of the printer 100. Sample interrupt service routines are appended to this document as computer source code on CD-ROM media.

The interrupt service routines provide real-time servicing for the fuser temperature control, the main paper drive motor speed (ramp-up and ramp-down), and the laser beam scanner. Because the routines are interrupt-based, the overhead to system CPU is minimal. The source code also includes functions for manipulating the other parts of the mechanism that do not require real-time control.

The flash memory 139 includes various parameters necessary for efficient operation of the printer 100. These param-

| | A2D Enable Register (AER) | | | | | | | | | | | | | | | | | | | | | | Read/Write | | | | | 0x01050010 | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | E |
| Default | | | | | | | | | | | | | | | | | | | | | | | | | | | | | | | |
| X | X | X | X | X | X | X | X | X | X | X | X | X | X | X | X | X | X | X | X | X | X | X | X | X | X | X | X | X | X | X | 0 |

E: Enable A-to-D sampling (1 = enabled)

The analog to digital (AD, A2D) converter interface 156 includes a plurality of AD data registers one embodiment of which are illustrated below. These registers are continually updated from an external A-to-D converter when the controller circuits 140 are enabled via the A2D enable register. The AD converter interface 156 can include the AD circuits integrated within the ASIC 130.

eters can include, for example only, fuser temperature settings, print engine timing, and various voltage control values.

From the foregoing, it will be appreciated that the present invention is novel and offers advantages over the current art. Although a specific embodiment of the invention is described and illustrated above, the invention is not to be limited to the specific forms or arrangements of parts so described and

| | A2D Data Register 0 (ADR0) | | | | | | | | | | | | | | | | | | | | | | Read | | | | | 0x0105000 | | | |
|---|---|---|---|---|---|---|---|---|---|---|---|---|---|---|---|---|---|---|---|---|---|---|---|---|---|---|---|---|---|---|---|
| | A2D Data Register 1 (ADR1) | | | | | | | | | | | | | | | | | | | | | | Read | | | | | 0x01050004 | | | |
| | A2D Data Register 2 (ADR2) | | | | | | | | | | | | | | | | | | | | | | Read | | | | | 0x01050008 | | | |
| | A2D Data Register 3 (ADR3) | | | | | | | | | | | | | | | | | | | | | | Read | | | | | 0x0105000C | | | |
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | D | D | D | D | D | D | D | D |
| Default | | | | | | | | | | | | | | | | | | | | | | | | | | | | | | | |
| X | X | X | X | X | X | X | X | X | X | X | X | X | X | X | X | X | X | X | X | X | X | X | X | X | X | X | X | X | X | X | X |

D[7:0]: 8-bit A-to-D conversion results for each channel
The values are only updated when the A-to-D converter is enabled in the A2D Enable Register.

illustrated. The invention is limited by the claims that follow. Only those claims specifically reciting "means for" or "step for" should be construed in the manner required under the sixth paragraph of 35 U.S.C. section 112.

What is claimed is:

1. An integrated circuit for controlling operation of a printer to generate a printed page, the integrated circuit comprising:
a processor core to format data into printer formatted data; and
printer control circuitry in communication with the processor core,
wherein the processor core further controls the printer control circuitry to generate the printed page in accordance with the printer formatted data, and
wherein the printer control circuitry comprises a fuser controller, a stepper motor controller, an analog to digital converter, a laser scanner controller, a voltage controller, a print engine input-output circuit, a page timer and an interrupt controller.

2. The integrated circuit of claim 1, wherein the processor core and the printer control circuitry are connected to a backplane in the integrated circuit.

3. The integrated circuit of claim 1, wherein the printer control circuitry communicates with electro-mechanical components of the printer to generate the printed page in accordance with the printer formatted data.

4. The integrated circuit of claim 3, wherein the printer control circuitry comprises a rewritable memory location, wherein the rewritable memory location receives operating instructions to control the electro-mechanical components of the printer.

5. The integrated circuit of claim 4, wherein the rewritable memory location comprises a flash memory.

6. The integrated circuit of claim 4, wherein the operating instructions comprise an interrupt service routine programmed to execute on an interrupt of the printer.

7. The integrated circuit of claim 4, wherein:
the printer control circuitry further comprises a fuser controller to control operation of a printer fuser; and
the rewritable memory location comprises a memory register to receive fuser operating data associated with the printer fuser.

8. The integrated circuit of claim 7, wherein the fuser operating data comprises pulse width modulation values for use in controlling a temperature of a heating element in the printer fuser.

9. The integrated circuit of claim 1, further comprising an internal bus, wherein the printer control circuitry communicates with the processor core via the internal bus.

10. A printer comprising the integrated circuit of claim 1.

11. The printer of claim 10, wherein the printer comprises a laser printer.

12. A method comprising:
receiving data relating to a print job at an integrated circuit;
processing the data in a processor core of the integrated circuit;
communicating the data processed in the processing core with a controller circuit in the integrated circuit, wherein the controller circuit includes a fuser controller, a stepper motor controller, an analog to digital converter, a laser scanner controller, a voltage controller, a print engine input-output circuit, a page timer and an interrupt controller; and
executing a plurality of interrupt-based service routines to control electro-mechanical components associated with a printer,
wherein the data processing and control of the electro-mechanical components are exclusively executed by the integrated circuit.

13. The method of claim 12, wherein the printer comprises a laser printer.

* * * * *